United States Patent
Sames et al.

(10) Patent No.: US 8,771,044 B2
(45) Date of Patent: Jul. 8, 2014

(54) CUTTING MODULE

(75) Inventors: Jörg Sames, Alten Büseck (DE);
Stephan Clößner, Ehringshausen Katzenfurt (DE)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 707 days.

(21) Appl. No.: 13/021,517

(22) Filed: Feb. 4, 2011

(65) Prior Publication Data
US 2011/0237170 A1     Sep. 29, 2011

(30) Foreign Application Priority Data
Feb. 5, 2010   (EP) ...................................... 10001219

(51) Int. Cl.
A22C 11/00     (2006.01)
(52) U.S. Cl.
USPC ............................................................ 452/48
(58) Field of Classification Search
USPC ................... 452/30–32, 35–37, 46–48, 51
See application file for complete search history.

(56) References Cited

U.S. PATENT DOCUMENTS

| | | | |
|---|---|---|---|
| 3,543,378 A | 12/1970 | Klenz | |
| 3,728,773 A | 4/1973 | Dobbert | |
| 4,017,941 A | 4/1977 | Raudys et al. | |
| 4,800,094 A * | 1/1989 | Freda et al. | 426/513 |
| 5,114,394 A | 5/1992 | Madsen | |
| 6,112,499 A * | 9/2000 | Lyskawa et al. | 53/138.7 |
| 6,871,474 B2 * | 3/2005 | Topfer | 53/138.4 |
| 6,920,738 B2 * | 7/2005 | Wilkins et al. | 53/417 |
| 6,932,688 B2 * | 8/2005 | Stanley et al. | 452/48 |
| 6,932,689 B2 * | 8/2005 | Stimpfl | 452/49 |
| 6,990,791 B2 * | 1/2006 | Tanner et al. | 53/560 |
| 7,395,638 B2 * | 7/2008 | Wilkins et al. | 53/138.4 |
| 7,478,515 B2 * | 1/2009 | Griggs et al. | 53/417 |
| 7,536,838 B2 * | 5/2009 | Whittlesey et al. | 53/417 |
| 7,625,266 B2 * | 12/2009 | Bontjer et al. | 452/49 |
| 7,739,855 B2 * | 6/2010 | Griggs et al. | 53/138.4 |

(Continued)

FOREIGN PATENT DOCUMENTS

DE     101 31 807 C1     7/2002

OTHER PUBLICATIONS

EP10001219.4-1260 Extended European Search Report dated Aug. 2, 2010, 6 pgs.

*Primary Examiner* — Richard Price, Jr.
(74) *Attorney, Agent, or Firm* — Hahn Loeser & Parks LLP

(57) ABSTRACT

The invention relates to a clipping machine for producing sausage-shaped products comprising: a filling tube for feeding a tubular casing provided on the filling tube with filling material, a displacer unit having at least two pairs of displacer elements for gathering the filled tubular casing and for providing a plait-like portion, which is at least approximately free of filling material, a clipping device for applying two closure means to the plait-like portion, a first clip to close the tubular casing of the actually filled sausage-shaped product, and a second clip in order to close the front end of the tubular casing of the sausage-shaped product provided on the filling tube, and a cutting device having at least one blade for cutting the packing material between the first and second closure means wherein the cutting device comprises a fluid drive for driving the blade and being coupled to a fluid source.

12 Claims, 4 Drawing Sheets

(56) References Cited

U.S. PATENT DOCUMENTS

| | | | |
|---|---|---|---|
| 7,854,103 B2 * | 12/2010 | Griggs et al. | 53/138.1 |
| 8,028,497 B2 * | 10/2011 | Griggs et al. | 53/138.4 |
| 8,398,467 B2 * | 3/2013 | Vila Bonas | 452/42 |
| 2009/0145085 A1 | 6/2009 | May et al. | |

\* cited by examiner

CUTTING MODULE

This application claims priority to, and the benefit of, European Patent Application No. 10 001 219.4-1260, filed Feb. 5, 2010, which is hereby incorporated by reference.

BACKGROUND OF THE INVENTION

The present invention relates to a clipping machine for producing sausage-like products according to the preamble of claim 1.

In particular, the present invention relates to a clipping machine for producing sausage-shaped products comprising a filling tube for feeding a tubular casing made from a packing material and provided on the filling tube with filling material, like sausage meat, a displacer unit having at least two pairs of displacer elements for gathering the filled tubular casing and for providing a plait-like portion, which is at least approximately free of filling material, a clipping device for applying two closure means, like clips, to the plait-like portion, a first clip in order to close the tubular casing of the actually filled sausage-shaped product, and a second clip in order to close the front end of the tubular casing of the sausage-shaped product provided on the filling tube, and a cutting device having at least one blade for cutting the packing material between the first and second closure means wherein the cutting device comprises a fluid drive for driving the blade and being coupled to a fluid source.

A clipping machine for producing products having a sausage-like shape, for example sausages, is known from German patent 101 31 807. Said known clipping machine comprises a filling tube on which a tubular casing being formed from a sheet-like packaging material, is stored. A first closing element or closing clip, respectively, is applied to the tubular casing forming the first end of the sausage-shaped product. Filling material is conveyed via the filling tube into the tubular casing. After a predetermined volume of filling material has been filled into the tubular casing, plait-like displacer elements displacing the filling material in a direction at least approximately perpendicular to the product axis and forming a neck or plait-like portion which is at least approximately free of filling material. To said plait-like portion, a first closing clip is applied closing the actually filled sausage-shaped product, and a second closing clip is applied to the plait-like portion closing the end of the remaining tubular casing forming the first end of the subsequent sausage-shaped product to be produced. After the filling and closing process, the plait-like portion is cut between the first and second closing clip to form a separate sausage-like product.

For executing the cutting step, German patent 101 31 807 discloses a cutting device which is provided in the form of an angulate pivot lever. Said pivot lever is pivoted about a pivot axis by a pneumatic cylinder which is connected to one end of the pivot lever by a linkage. The other end of the pivot lever comprises a cutting edge which is pivoted towards the plait-like portion for cutting the plait between the two closing clips.

In case that the pivot lever or the cutting edge are damaged and the pivot lever has to be replaced by another one, a number of parts, like the linkage or the pivot axis have to be disassembled, which is expensive. In particular, the pneumatic connection between the pneumatic cylinder and the pneumatic source must be interrupted leading to several mounting operations. Same is true if the cutting edge is worn and has to be ground. The complete cutting device has to be dissembled.

BRIEF SUMMARY OF THE INVENTION

Thus, it is an object of the present invention to provide a clipping machine which allows an easy and quick assembling/disassembling of the cutting device.

The aforesaid object is achieved by the features of claim 1. Advantageous configurations of the invention are described in claims 2 to 15.

According to the present invention, there is provided a clipping machine for producing sausage-shaped products. Said clipping machine comprises a filling tube for feeding a tubular casing made from a packing material and provided on the filling tube with filling material, like sausage meat, a displacer unit having at least two pairs of displacer elements for gathering the filled tubular casing and for providing a plait-like portion, which is at least approximately free of filling material, a clipping device for applying two closure means, like clips, to the plait-like portion, a first clip in order to close the tubular casing of the actually filled sausage-shaped product, and a second clip in order to close the front end of the tubular casing of the sausage-shaped product provided on the filling tube, and a cutting device having at least one blade for cutting the packing material between the first and second closure means wherein the cutting device comprises fluid drive for driving the blade and being coupled to a fluid source.

Moreover, the present invention proposes that the cutting device comprises coupling means for automatically coupling and decoupling the cutting device to and from the fluid source, without using any tool, when attaching or removing the cutting device to or from the clipping machine. In the case of wear occurred to the drive of the cutting device or to the blade, said cutting device may be exchanged very easily in a short time whereby costs and deadlock are reduced.

The coupling means may be realized by various coupling elements. In a preferred embodiment of the present invention, the coupling means include at least one male/female quick connector unit for connecting the cutting device to the fluid source. Said male/female quick connector unit allows a rapid, automatic and safe connecting and disconnecting at the cutting device to and from the clipping machine. Moreover, said male/female quick connector unit may have self-closing elements which prevent the pressurized fluid to come out of the cutting device and the connecting pipes leading to the fluid source.

It is advantageous that the clipping machine comprises a mounting plate for a releasable mounting of the cutting device to the clipping machine. Said mounting plate may include fixing means for establishing a safe, but releasable mounting of the cutting device to the clipping machine as well as to the fluid source.

To establish a safe fluid connection between the cutting device and the fluid source, the mounting plate may comprise at least one female quick connector and the cutting device may comprise at least one male quick connector which can be positionally aligned to said at least one female quick connector. However, it is in principle possible that the mounting plate is provided with at least one male quick connector and the cutting device comprise at least one female quick connector which can be, in turn, positionally aligned to said at least one male quick connector.

Furthermore, to provide a safe and releasable mounting of the cutting device to the clipping machine, the mounting plate comprises at least one quick fastener unit for rapidly and releasably fastening the cutting device to the mounting plate. To enable said safe mounting of the cutting device to the clipping machine, the cutting device may include at least one clamping section to be engaged by the at least one quick fastener unit.

In another embodiment of the inventive clipping machine, the cutting device includes aligning or alignment pins, respectively, for aligning the cutting device relative to the clipping machine. The aligning or alignment pins can cooperate with alignment holes being provided at the clipping machine. Said aligning or alignment pins and the respective alignment holes ensure a correct positional alignment of the cutting device as well as the male and female members of the male/female connector.

The cutting device includes a knife or blade, respectively, which can be moved by different mechanical elements like pivoted levers and the like. The cutting device according to the present invention preferably comprises a linearly movable blade, a linear drive for moving the blade and a housing for accommodating the linear drive. This structure allows a compact construction of the cutting device in form of a module, which can be exchanged easily. To realize the linear movement of the blade, the linear drive can be a pneumatic piston/cylinder drive including a piston rod. Advantageously, the linearly movable blade is directly coupled to the piston rod.

The fluid channels for supplying pressurized fluid to the piston/cylinder drive are arranged inside the wall of the housing for coupling the male or female quick connector, respectively, to the piston/cylinder drive. Thereby, the structure of the cutting device becomes more compact and easier to handle.

To prevent the pressurized fluid from coming out of the cylinder, a sealing device is arranged inside the housing for sealing the cylinder against the atmosphere. In a preferred embodiment of the piston/cylinder drive, the sealing device is a pressure activated sealing device. Such a pressure activated sealing device assures a safe sealing of the piston/cylinder drive.

Advantageously, the clipping machine comprises an additional male/female quick connector for connecting the sealing device to a fluid source and to allow the pressure activated sealing device to be coupled and decoupled to and from the clipping machine together with the cutting device. Thus, an inventive cutting device can have three male/female connectors, namely two for the drive of the blade and one for the sealing device.

Further advantages and a preferred embodiment will be described in the following together with the drawings listed below. The expressions "left", "right", "below" and "above" are referred to the drawings in an alignment such that the reference numbers used can be read in normal.

DETAILED DESCRIPTION OF THE INVENTION

Figure 1:
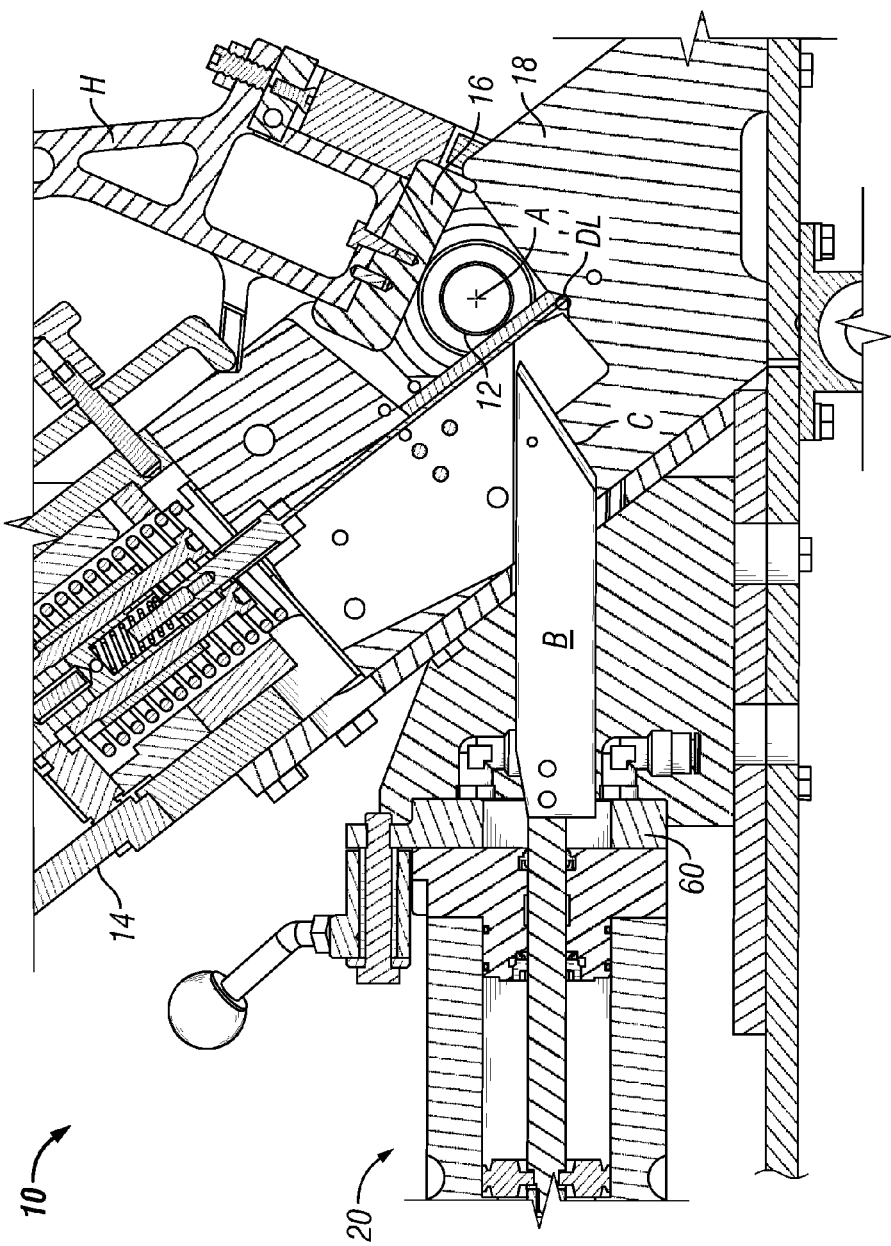
FIG. 1: is a schematically view of a clipping machine including a cutting device according to the present invention.

FIG. 1 shows a manually actuated clipping machine including a cutting device according to the present invention. Clipping machine 10 includes a filling tube 12 having a longitudinal axis A, a clipping device 14, a first and second pair of upper and lower displacer elements 16, 18 and a partly shown hand lever H for actuating clipping machine 10. In FIG. 1, only upper and lower displacer elements 16, 18 of the first pair of displacer elements are shown. Upper displacer elements 16 of both pair of displacer elements are reversibly moveable toward lower displacer elements 18, thereby forming a displacer clearance DL. Moreover, clipping machine 10 further includes a cutting device 20 having a blade B with a cutting edge C which is described in more detail in conjunction with FIGS. 2 to 4. Cutting device 20 is mounted on a mounting plate 60 of the clipping machine 10.

Figure 2:
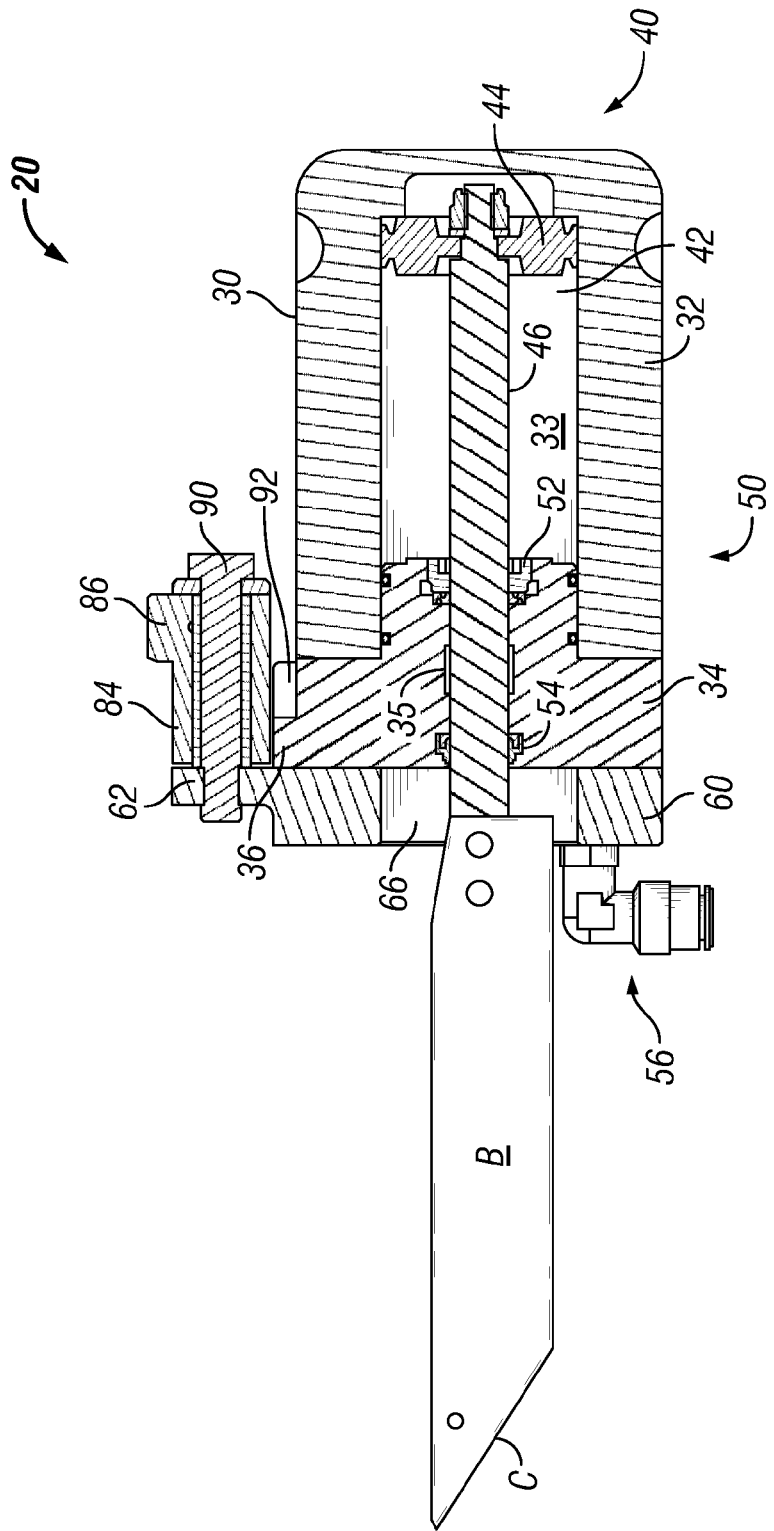
FIG. 2: is a cross-sectional view of the cutting device according to the present invention.

As it can be inferred from the cross-sectional view of cutting device 20 according to FIG. 2, cutting device 20 comprises a housing 30 accommodating a pneumatic piston/cylinder drive 40. Housing 30 consists of a first, cup-like housing part 32 having a cavity 33 and a second, flat closure element 34 closing cup-like housing part 32. Cavity 33 forms the cylinder 42 for the piston/cylinder drive 40, wherein a piston 44 is linearly guided in cylinder 42. A piston rod 46 is coupled to piston 44 by its first end. Piston rod 46 extends from piston 44 into the direction towards flat closure element 34 and is guided through cylindrical through-hole 35 in flat closure element 34 to the outside of housing 30. Blade B is mounted coaxially with piston rod 46 on the second end of piston rod 46 which is located outside of housing 30, to extend in the same direction like piston rod 46.

Inside through-hole 35, a sealing device 50 is arranged to surround piston rod 46 to seal cylinder 42 against the atmosphere. Sealing device 50 comprises a first sealing member 52 which is arranged in the region of the inner surface of flat closure element 34 for preventing losses in pressure inside cylinder 42, and a second sealing member 54 in the region of the outer surface of flat closure element 34 for preventing dirt particles from entering cylinder 42.

Sealing device 50 is a pressure controlled sealing device activated by applying a pressurized fluid to at least first sealing member 52. Pressure activated sealing device 50 may balance the removal of sealing material by wear occurring to sealing members 52, 54 by providing a predetermined pressure to sealing members 52, 54. Moreover, by adjusting a predetermined pressure to sealing members 52, 54, a sealing force may be adjusted or kept constant.

A male/female quick connector 56 connects sealing device 50 to a fluid source via a not shown channel inside cup-like housing part 32. Third male/female quick connector 56 consists of a male member and a mating female member.

Figure 3:
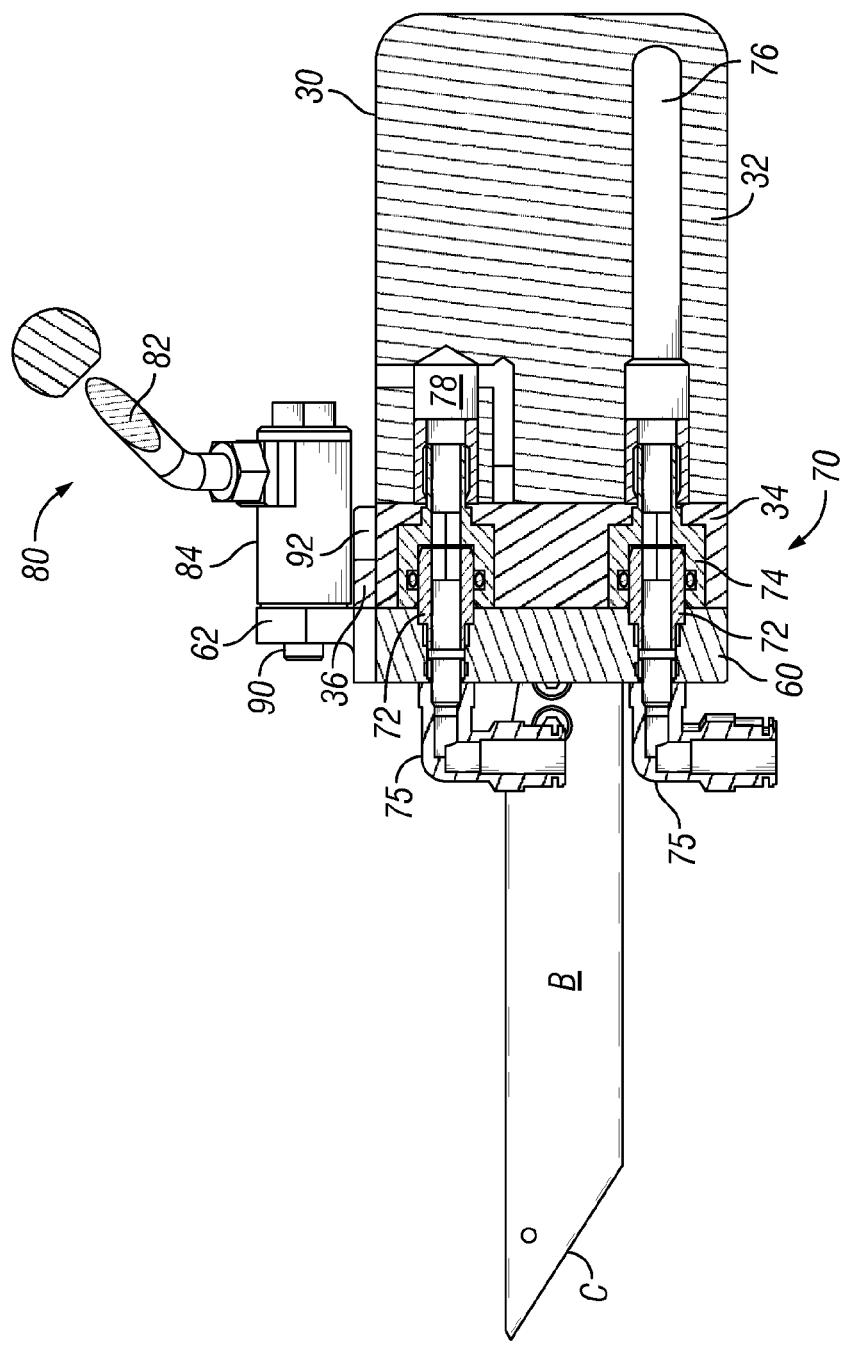
FIG. 3: is a cross-sectional view of the cutting device according to the present invention in a plane parallel to that of FIG. 2.

FIG. 3 is a further cross-sectional view of cutting device 20 in a plane parallel to that of FIG. 2 through a wall part of housing 30. As it can be inferred from FIG. 3, coupling means in the form of male/female quick connectors 70 are provided for coupling piston/cylinder drive 40 to a fluid source delivering pressurized fluid like air or oil to cylinder 42. Each quick connector 70 consists of a male member 72 and a mating female member 74. Male members 72 are provided in mounting plate 60 and projecting from mounting plate 60 towards flat closure element 34. Female members 74 provided inside flat closure element 34 and facing mounting plate 60 are connected to the upper and lower side of piston 44 inside cylinder 42 by channels 76, 78.

As it further can be seen in FIGS. 1 to 3, cutting device 20 is attached to mounting plate 60 which is firmly connected with clipping machine 10. Mounting plate is aligned to clipping machine 10 in a manner that blade B of cutting device 20, when mounted at mounting plate 60, is directed to displacer clearance DL and perpendicularly aligned to longitudinal axis A of filling tube 2. Mounting plate 60 comprises male members 72, mounted in holes aligned to female members 74 of quick connector 70. The outer surface of flat closure element 34 abuts against the mating surface of mounting plate 60, whereby male members 72 engage female members 74 for establishing a sealed fluid connection between the fluid source, which is connected to the male members 72 via manifolds 75, and piston 44 connected to female members 74 via fluid channels 76, 78.

For preventing cutting device 20 from falling off mounting plate 60, flat closure element 34 comprises a projection 36 attached to a side surface of flat closure element 34. A bracket 62 extends from a side surface of mounting plate 60 and matches with projection 36. A handle 80 is rotatably mounted to bracket 62 by a bolt 90. Handle 80 comprises a knob 82 connected to a cylindrical socket 84 having a longitudinally extending hole, through which bolt 90 is guided. A partially circumferential collar 86 is provided at the end of socket 84 opposite to bracket 62. A brick-shaped fitting piece 92 is mounted on the side surface of flat closure element 34, extending parallel to projection 36. The height of projection 36 is equal to the height of fitting piece 92 and corresponds to the gap between socket 84 and side surface of flat closure element 34. Partially circumferential collar 86 is aligned at socket 84 to engage the side surface of fitting piece 92 opposite to projection 36. This structure forms a quick fastener unit.

Figure 4:
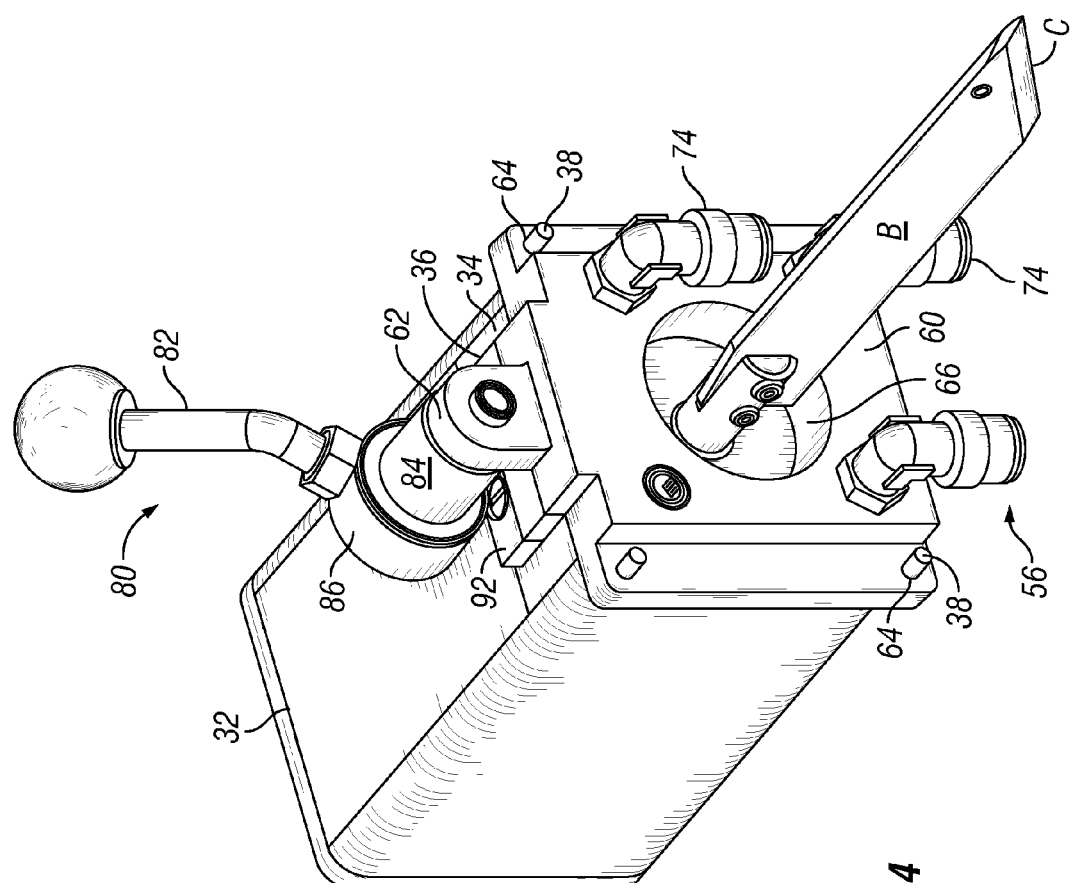
FIG. 4: is an overall perspective view of the cutting device according to FIGS. 2 and 3.

FIG. 4 shows an overall perspective view of cutting device 20. In the region of each of its four corners, mounting plate 60 comprises guide holes 64 extending in a direction parallel to piston rod 46. Moreover, a central hole 66 in mounting plate 60 allows piston rod 46 together with blade B to be inserted through mounting plate 60.

Mounting screws 38 are attached to the mounting plate 60, extending in a direction towards clipping machine 10. Mounting screws 38 are stuck into guide holes 64 for fixedly mounting plate 60 to clipping machine 10.

In FIG. 4, handle 80 is in the closed position. As it can be seen from FIG. 4, partially circumferential collar 86 engages the side surface of fitting piece 92 opposite to projection 36. Thereby, housing 30 of cutting device 20 is pressed against mounting plate 60.

FIG. 3 shows handle 80 in the opened position. In this position, partially circumferential collar 86 does not engages fitting piece 92 and, accordingly, housing 30 of cutting device 20 is not pressed against mounting plate 60.

In the production of sausage-shaped products, like sausages, a tubular casing is provided on filling tube 12 of clipping machine 10. The tubular casing is closed at its first end by a closure clip. Filling material is conveyed through filling tube 12 into the tubular casing which is thereby drawn of filling tube 12. After a predetermined volume of filling material is filled into the tubular casing, upper and lower displacer elements 16, 18 of clipping machine 10 are moved towards each other, thereby gathering the tubular casing and forming a plait-like portion, which is approximately free from filling material. Two closure clips are attached to the plait-like portion, one in order to close the actually filled sausage-shaped product and the second in order to close the first end of the subsequent sausage-shaped product to be filled. In the case that single sausage-shaped products are to be produced, cutting device 20 is activated to separate the actually produced sausage-shaped product from the remaining tubular casing, by cutting the tubular casing between the two closure clips attached to the plait-like portion.

For activating cutting device 20, pressurized fluid which is preferably air in food production, is guided through male/female quick connectors 70 and channels 76, 78 alternately to the respective side of piston 44 to move blade B back and forth via piston rod 46 which is coupled to piston 44.

During sausage production, blade B of cutting device 20 may be accidentally damaged or cutting edge C of blade B may become blunt. In this case, it is necessary to remove cutting device 20 from clipping machine 10 to enable blade B to be exchanged by a new blade or to sharpen blade B.

For exchanging cutting device 20, clipping machine 10 is switched off. A safety device (not shown) can cause piston 44 to be moved in a position as shown in FIGS. 2 to 4, wherein piston rod 46 is positioned inside cylinder 42 and blade B is secured in a position out of engagement with the clipping device 14.

To remove cutting device 20 from mounting plate 60, handle 80 is moved into the opened position. Thereby, partially circumferential collar 86 comes out of engagement with fitting piece 92. Cutting device 20 now can be moved in a direction coaxial with piston rod 46 and away from mounting plate 60. While moving away cutting device 20 from mounting plate 60, male members 74 of male/female quick connectors 70 are pulled out of female members 72 and the fluid connection between piston/cylinder drive 40 of cutting device 20 and the fluid source is disconnected.

In a useful embodiment, at least male members 72 of male/female quick connectors 70 include self closing elements like sealing elements. Such elements help maintaining the fluid pressure at least inside the fluid system of the clipping machine 10 and reducing the loss of pressurized fluid.

For mounting a new cutting device 20 or a cutting device 20 having a new or regenerated blade B, blade B is stuck through central opening 66 in mounting plate 60. Male members 72 of male/female connectors 70 are aligned to female members 74. Cutting device 20 is then moved towards mounting plate 60 in a direction coaxial with piston rod 46. It has to be assured, that handle 80 is in the opened position. While moving cutting device 20 towards mounting plate 60, male members 74 of male/female quick connectors 70 engage female members 72 for establishing a fluid connection between piston/cylinder drive 40 of cutting device 20 and the fluid source. Finally, handle 80 is turned into the closed position, whereby partially circumferential collar 86 engages fitting piece 92 for securely mounting cutting device 20 to mounting plate 60.

While removing and replacing cutting device 20 from and to clipping machine 10, also the fluid connection between pressure activated sealing device 50 and the fluid source is disconnected and reestablished, accordingly.

It has to be understood, that the clipping machine 10 is controlled by a not shown control unit, which controls the production steps of the clipping machine 10. Thus, a safety device may also be provided, which may sense the presence or absence of cutting device 20 and which, in case of the absence of cutting device 20, prevents clipping machine 10 from being started.

In conjunction with the present embodiment of the clipping machine 10, only one quick fastener or handle 80 is described for securely mounting cutting device 20 to mounting plate 60. Of course, more than one quick fastener unit may be provided, e.g. a second one at the opposite side of mounting plate 60.

The fluid pressurized and provided to cutting device 20, may be air, as usual in the food stuff production. But, also oil or any other capable fluid may be used.

The invention claimed is:
1. A clipping machine for producing sausage-shaped products, comprising:

a filling tube for feeding a tubular casing made from a packing material and provided on the filling tube, with filling material, a displacer unit having at least two pairs of displacer elements for gathering the filled tubular casing and for providing a plait-like portion, which is at least approximately free of filling material, a clipping device for applying two closure means to the plait-like portion, a first clip in order to close the tubular casing of the actually filled sausage-shaped product, and a second clip in order to close the front end of the tubular casing of the sausage-shaped product provided on the filling tube, and a cutting device having at least one blade for cutting the packing material between the first and second closure means wherein the cutting device comprises a fluid drive for driving the blade and being coupled to a fluid source, wherein that the cutting device comprises coupling means for automatically coupling and decoupling the cutting device to and from the fluid source when attaching or removing the cutting device to or from the clipping machine, wherein the clipping machine comprises a mounting plate for a releasable mounting of the cutting device to the clipping machine, wherein the mounting plate comprises at least one male quick connector or at least one female quick connector, and wherein the cutting device comprises at least one female quick connector or at least one male quick connector, respectively, positionally aligned to the at least one quick connector of the mounting plate.

2. The clipping machine according to claim 1,
wherein the coupling means includes at least one male/female quick connector unit for connecting the cutting device to the fluid source.

3. The clipping machine according to claim 1 further comprising,
at least one quick fastener unit for rapidly fastening the cutting device to the mounting plate.

4. The clipping machine according to claim 3,
wherein the cutting device includes at least one clamping section to be engaged by the at least one quick fastener.

5. The clipping machine according to claim 1,
wherein the cutting device is aligned relative to the clipping machine-by quick connectors.

6. The clipping machine according to claim 1,
wherein the cutting device comprises a linearly movable blade, a linear drive for moving the blade, and a housing for accommodating the linear drive.

7. The clipping machine according to claim 6,
wherein the linear drive is a pneumatic piston/cylinder drive including a piston rod.

8. The clipping machine according to claim 6,
wherein fluid channels are arranged inside the wall of the housing.

9. The clipping machine according to claim 7,
wherein the linearly movable blade is coupled to the piston rod.

10. The clipping machine according to claim 7,
wherein a sealing device is arranged inside the housing for sealing the cylinder against the atmosphere.

11. The clipping machine according to claim 10,
wherein the sealing device is a pressure activated sealing device.

12. The clipping machine according to claim 10 further comprising,
an additional male/female quick connector for connecting the sealing device to a fluid source.

* * * * *